United States Patent [19]
Thompson

[11] Patent Number: 5,601,145
[45] Date of Patent: Feb. 11, 1997

[54] FARM IMPLEMENT HILLSIDE LEVELING DEVICE

[76] Inventor: L. D. Thompson, Rte. 2, Box 872, Max Meadows, Va. 24360

[21] Appl. No.: 408,399

[22] Filed: Mar. 22, 1995

[51] Int. Cl.$^6$ .................................................. E02F 9/18
[52] U.S. Cl. .................... 172/4.5; 172/611; 280/840; 280/6.12; 280/755; 280/758; 180/41
[58] Field of Search ............. 172/4.5, 611; 280/DIG. 1, 280/6.12, 6.1, 840, 755, 758; 180/41; 212/196; 414/719

[56] References Cited

U.S. PATENT DOCUMENTS

| | | | |
|---|---|---|---|
| 1,165,701 | 12/1915 | Mutti | 280/DIG. 1 X |
| 1,231,531 | 6/1917 | Shilling . | |
| 2,767,995 | 10/1956 | Stout | 280/755 |
| 3,083,034 | 3/1963 | Hollowell | 280/DIG. 1 X |
| 3,092,397 | 6/1963 | Dullabaun et al. | 280/DIG. 1 X |
| 3,397,898 | 8/1968 | Denney et al. . | |
| 3,595,410 | 7/1971 | Lemmon . | |
| 3,608,645 | 9/1971 | Meiners . | |
| 3,802,720 | 4/1974 | Ellis . | |
| 3,822,073 | 7/1974 | Sieren . | |
| 4,094,534 | 6/1978 | Welke et al. . | |
| 4,518,305 | 5/1985 | Stuhrmann | 280/755 X |
| 4,861,069 | 8/1989 | Gunter | 172/611 X |
| 5,040,613 | 8/1991 | Dodd et al. . | |
| 5,178,402 | 1/1993 | Love et al. . | |
| 5,230,529 | 7/1993 | Haravey-Bailey . | |
| 5,267,517 | 12/1993 | Jones . | |

FOREIGN PATENT DOCUMENTS 466724  1/1969  Switzerland .

OTHER PUBLICATIONS

"Drawn, Integral and Folding Planters", John Deere, Oct., 1983.

*Primary Examiner*—Terry Lee Melius
*Assistant Examiner*—Christopher J. Novosad
*Attorney, Agent, or Firm*—Nixon & Vanderhye P.C.

[57] ABSTRACT

A farm implement includes a plurality of equipment heads (such as planter heads) for engaging the earth and a carriage for mounting the heads for movement in a first direction. The equipment heads are kept level when moving in a first direction over terrain that is sloped and a second direction substantially perpendicular to the first direction so that the equipment heads remain in proper operative engagement with the earth. The leveling mechanism includes a channel shaped structure so that it is substantially stationary with respect to the carriage and extends substantially in a second direction, a movable ballast element mounted in the channel shaped structure, and a powered ballast moving device. The moving device has a first portion mounted to the ballast element, and a second portion mounted to the channel shaped structure with a force applicator (such as an hydraulic cylinder assembly) for moving the first portion with respect to the second portion in the second direction to reposition the ballast element with respect to the channel shaped structure. The channel shaped structure is preferably open ended, and rollers, ball bearings, low friction coatings, or lubricating fluids are provided between the ballast element and the channel shaped structure for relatively friction free movement. A control panel may be mounted in a tractor cab to operate the hydraulic cylinder assembly.

18 Claims, 2 Drawing Sheets

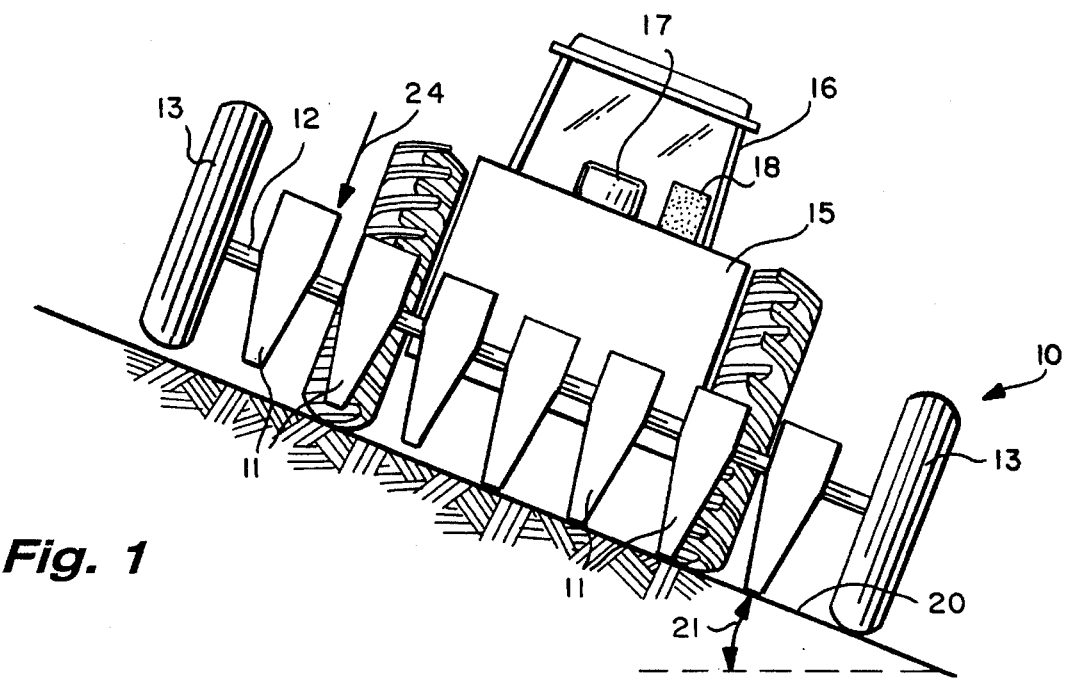
Fig. 1
Fig. 2
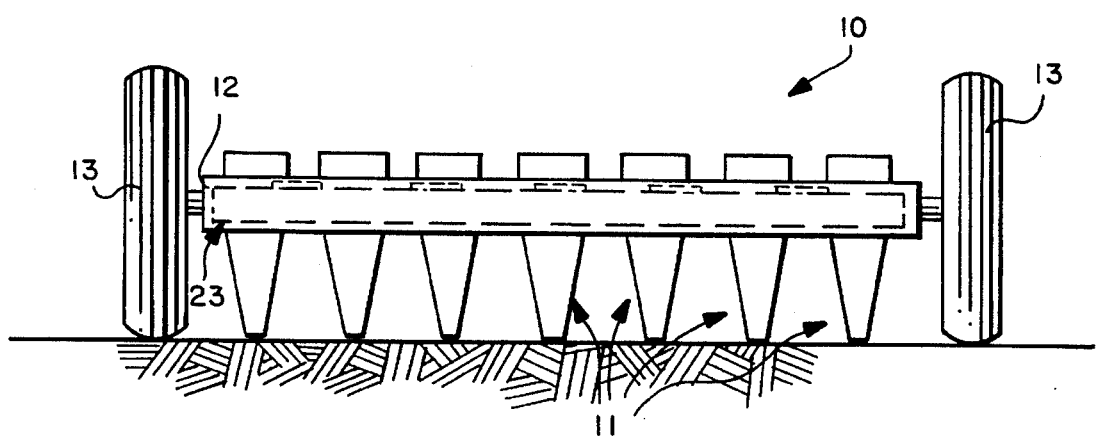

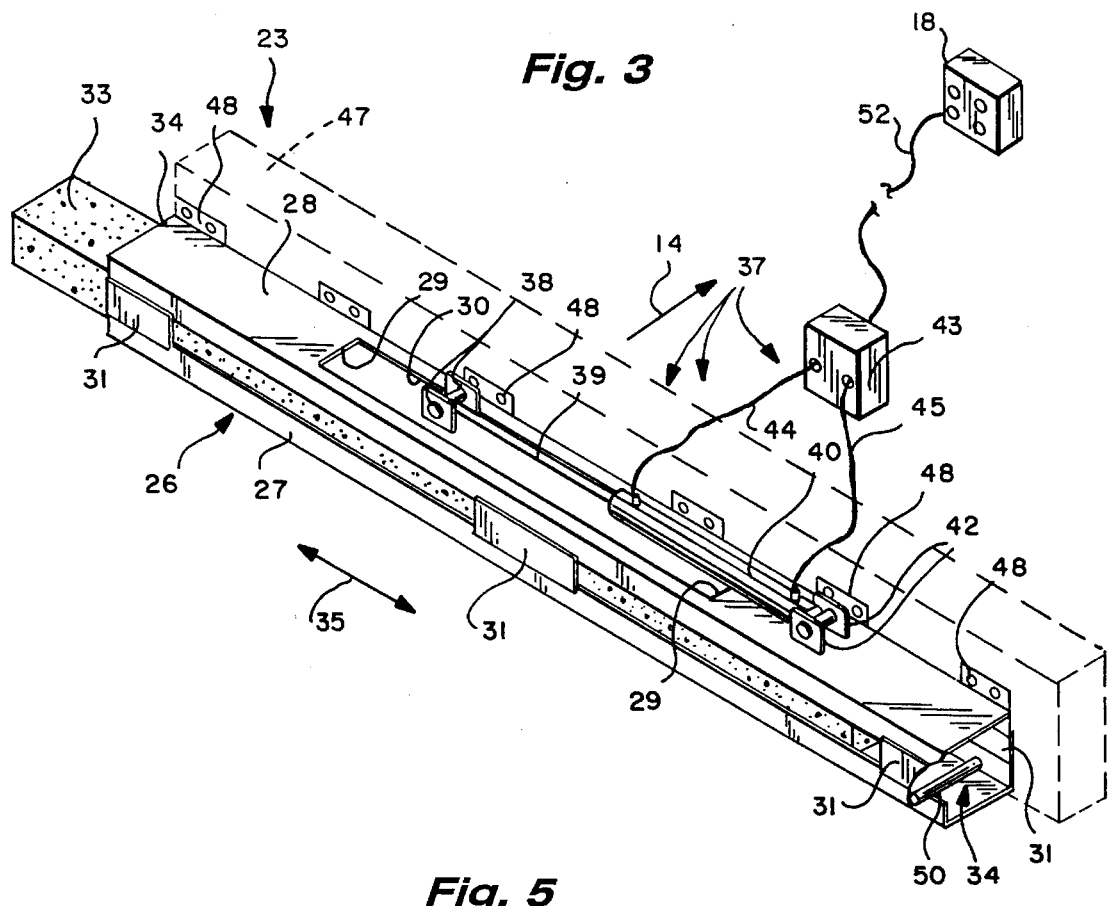
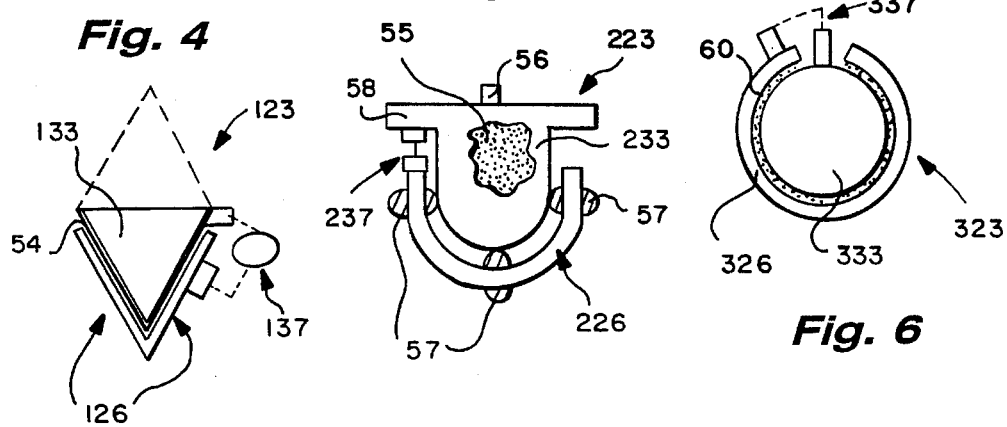

FARM IMPLEMENT HILLSIDE LEVELING DEVICE

BACKGROUND AND SUMMARY OF THE INVENTION

When planting or cultivating farm land, there are many different types of farm implements that require a substantially level orientation for successful operation. For example, planters that are commercially available, regardless of the seed tube design or type of seed meter or mechanism or firming wheel construction must engage the earth in order to properly place seeds into the soil in a continuous and straight row (allowing for periodic weed control and final harvesting). On very steep landscapes (e.g. a slope of about 10% or more) gravity forces can overcome the balance of the implement and cause the uphill side to lose contact with the soil. When this occurs the seed is not planted properly, often being left on top of the earth and, therefore, is lost to wildlife or does not germinate, creating skipped rows and thus lost productive field areas. Planters are not the only farm implements that suffer from this condition, although perhaps more so than others, but also a wide variety of different cultivating, harvesting, and planting devices can be adversely affected by this phenomena.

According to the present invention this problem is minimized or eliminated in a simple and straightforward and inexpensive manner. According to the present invention a remote control ballast mechanism is associated with the farm implement, or in some cases a tractor for pulling the farm implement, to insure that the equipment heads (whether planter, cultivating, or harvesting) properly engage the earth by moving a massive ballast element which overcomes the tilting action when the farm implement is being moved along sloping terrain.

According to one aspect of the present invention a leveling mechanism, per se, is provided. The leveling mechanism comprises the following elements: An open ended channel shaped structure mounted so that it is substantially stationary with respect to a surface and extends substantially in a first dimension. A movable ballast element mounted in the channel shaped structure so that portions of the ballast element may be moved past either open end of the channel shaped structure. And a powered ballast element moving device having a first portion mounted to the ballast element, a second portion mounted to the channel shaped structure, and a force applicator for moving the first portion with respect to the second portion in the first dimension to reposition the ballast element with respect to the channel shaped element. The channel shaped elements may have almost any shape, V-shape, quadrate in cross section, U-shape, circular, etc. Also, the ballast element may be a heavy metal bar or rod virtually solid in cross section (e.g. a steel bar), or tubular element filled with ballast material, such as sand, lead shot, or water. The ballast element typically has a weight of at least 100 pounds, with a size dependent upon the size of the farm implement on which the leveling mechanism is utilized.

The leveling equipment may also comprise means for providing a relatively friction free movement of the ballast element in the channel shaped structure, such as a plurality of rollers, plurality of ball bearings, one or more low-friction coatings (such as polytetrafluoroethylene) on at least one of the ballast elements and the channel shaped structure, and/or lubricating fluid (such as a lubricating oil or gel) between the ballast element and the channel shaped structure. The force applicator preferably comprises a hydraulic cylinder assembly although a pneumatic cylinder assembly or an electric, pneumatic, or hydraulic motor connected to a screw and traveling nut, or the like, may also be provided as well as any other conventional mechanism capable of remote control and for essentially generally linear movement of the ballast element with respect to the channel shaped element. In fact both the ballast element and channel shaped element may have a common curvature rather than being completely straight.

According to another aspect of the present invention a farm implement is provided comprising the following elements: A plurality of equipment heads for engaging earth, to act on the earth. A carriage mounting the plurality of equipment heads for movement in a first direction. And means for levelling the equipment heads when moving in the first direction over terrain that is sloped in a second dimension substantially perpendicular to the first direction so that the equipment heads remain in proper operative engagement with earth, the means comprising: a channel shaped structure mounted so that it is substantially stationary with respect to the carriage and extends substantially in the second dimension; a movable ballast element mounted in the channel shaped structure; and a powered ballast element moving device having a first portion mounted to the ballast element, a second portion mounted to the channel shaped structure, and a force applicator for moving the first portion with respect to the second portion in the second dimension to reposition the ballast element with respect to the channel shaped structure.

The channel shaped structure has typically open ends so that portions of the ballast element may be moved by the power ballast element moving device past either open end of the channel shaped structure. A control panel is preferably provided for controlling operation of the force applicator from the cab or adjacent a seat (e.g. in the tractor) remote from the leveling means. The equipment heads may comprise a planter pulled by a tractor, with the leveling means mounted directly on the carriage, or under some circumstances—depending upon the type of equipment heads and the carriage, their size, and the type of tractor utilized—the leveling means may be mounted directly on the tractor.

In one of the simplest embodiments, the channel shaped structure comprises a substantially quadrate in cross section shaped channel with a bottom portion, with a plurality of rollers rotatable about axes substantially parallel to the first direction mounted on the bottom portion, and a ballast element has a weight of at least about 100 pounds. In this embodiment the force applicator typically comprises a hydraulic cylinder assembly controlled by a remote control mechanism. Stops may also be provided for preventing movement of the ballast element too far out of an open end of the channel shaped structure, for example the stops comprising the power ballast element moving device first portion and opposite surfaces of the channel shaped structure forming the cutout.

According to yet another aspect of the present invention a planter having self-leveling capabilities is provided comprising the following elements: A plurality of planter heads mounted to a carriage for movement in a first direction. A channel-shaped structure elongated in a second dimension substantially perpendicular to the first direction. A ballast element mounted in the channel shaped structure for movement with respect thereto in the second dimension. And a powered ballast element moving device having a first portion mounted to the ballast element, a second portion mounted to the channel shaped structure, and a force applicator for moving the first portion with respect to the second portion in the second dimension to reposition the ballast element with respect to the channel shaped element.

It is the primary object of the present invention to provide simple, inexpensive, yet effective remote controllable leveling, particularly suitable for use with farm implements (most preferably planters) to maintain proper operation thereof on sloping terrain. This and other objects will become clear from a detailed description of the invention and from the appended claims.

BRIEF DESCRIPTION OF THE DRAWINGS

FIG. 1 is a schematic end view illustrating problems existing in prior art planters when operated on steep sloping terrain;

FIG. 2 is an opposite end view of the planter of FIG. 1 with a leveling mechanism according to the present invention illustrated mounted in association therewith (in dotted line);

FIG. 3 is a top perspective view of a preferred form of the leveling mechanism according to the present invention; and FIGS. 4 through 6 are schematic end views of different configurations that the leveling mechanism according to the present invention may take.

DETAILED DESCRIPTION OF THE DRAWINGS

FIG. 1 illustrates a common problem with conventional planters when used for planting seeds in straight rows on steeply sloping terrain. In FIG. 1 a conventional planter 10 having a plurality of equipment (planter) heads 11 of any conventional configuration (for the planting tubes, firming wheels, and seed metering mechanisms) are illustrated by reference numeral 11, the heads 11 mounted on a carriage shown schematically by reference numeral 12. Carriage 12 is typically mounted by two or more wheels 13 for movement in a first direction (a direction into the page illustrated in FIG. 1). This first direction is indicated by arrow 14 in FIG. 3. The planter 10 is typically pulled by a tractor 15, e.g. having a cab 16 and/or an operator seat 17, with a control panel 18 for the equipment being pulled, therein.

FIG. 1 illustrates a very extreme situation where the planter 10 is being pulled along with sloping earth 20 in the first direction 14, the slope of the earth 20—as illustrated schematically by angle 21—being very steep (e.g. about 10 degrees or more). Under these circumstances, the uphill planting heads—in particular the three left-most heads 11 in FIG. 1—as well as even the uphill wheel 13, come out of operative contact with the earth 20, either causing malfunction or causing the seeds to be deposited on top of the earth 20 instead of in a proper furrow, or otherwise in moisture transferring contact with the soil.

FIG. 2 illustrates an exemplary leveling device according to the present invention—shown in dotted line and schematically by reference 23—mounted on the carriage 12, the leveling mechanism 23 functioning to solve the problem illustrated in FIG. 1 by causing the center of gravity of the planter 10, or the planter 10 and tractor 15 combination (depending upon the particular hitching mechanism, design of the equipment, or the like) to move uphill so that a downward force is applied—illustrated schematically by arrow 24 in FIG. 1—to move the uphill heads 11 back into contact with the soil 20.

Note that while planting heads 11 are illustrated in FIG. 1 it is to be understood that the equipment heads 11 may comprise any heads that are susceptible to the problems schematically illustrated in FIG. 1, including other types of planting heads, or cultivating or harvesting heads.

FIG. 3 illustrates one particular form of the leveling mechanism 23 that may be utilized according to the present invention. The device 23 includes a generally channel shaped structure, shown generally by reference 26 in FIG. 3. In the embodiment illustrated in FIG. 3 the channel shaped structure is quadrate (in this case rectangular) in cross section, and is formed by a first conventional generally U-shaped steel channel 27 at the bottom, a like channel 28 at the top having a cutout defined by edges 29, 30 therein, and a plurality of flat bars 31 welded or otherwise connected to the elements 27, 28 to hold them together to form a generally quadrate cross section channel shape of the channel shaped structure 26. Mounted in the hollow interior of the channel shaped structure 26 is a ballast element 33. The ballast element 33 has approximately the same cross sectional shape as the channel shaped element 26 so that its movement therein is properly guided. Typically the channel 26 has open ends 34. Normally the ballast 33 length is approximately the same as the channel shaped elements (that is their extent in the second dimension 35, substantially perpendicular to the first direction 14), although the ballast element 33 may extend outwardly from the open ends 34 even when properly centered. By providing the open ends 34, however, the length of the channel 26 may be kept to a minimum while the ballast element 33 can move out of the open ends 34.

The ballast element 33, in FIG. 3, is illustrated as a bar of heavy metal, such as steel, having a rectangular cross section. The position of the bar 33 in the dimension 35 is controlled by a powered ballast element moving device, illustrated generally by reference numeral 37 in FIG. 3. The device 37 comprises a first portion, such as the brackets 38 mounted to a piston rod 39 of a hydraulic cylinder 40, mounted to the ballast element 33, typically fixed thereto by welding or the like although it may be detachably mounted thereto by screws, bolts, or other conventional fasteners. The device 37 also comprises a second portion—such as the brackets 42 connected to the cylinder 40—mounted to the channel shaped structure 26, typically being welded or otherwise permanently affixed thereto, or fixed by screws, bolts, or like conventional fasteners. Hydraulic fluid is fed from a hydraulic pump 43 or the like through lines 44, 45 to opposite ends of the cylinder 40 to engage the piston associated with the piston rod 39 and to thereby move the piston rod 39 in and out of the cylinder 40, causing reciprocation of the ballast element 33 in the dimension 35. In order to prevent the ballast element 33 from moving too far so that it might bind or fall out of the channel 26, the cutout defined by the surfaces 29, 30 is scaled in the dimension 35 so that the surfaces 29 cooperate with the brackets 38 to provide positive stops at opposite ends of travel.

The channel shaped structure 26 is typically mounted to the carriage 12, or—as shown schematically by dotted line at 47 in FIG. 3—to a portion of tractor, or other farm implement, by the brackets 48. The brackets 48 may be welded or otherwise permanently affixed to the carriage 12 or to the tractor 47, or they may be releaseably connected by bolts, screws, or like conventional fasteners passing through openings in the brackets 48.

In order to facilitate movement of the ballast element 33 with respect to the channel shaped structure 26 in dimension 35, preferably means for providing relatively friction free movement are provided. Such means in the FIG. 3 embodiment comprise a plurality of steel rollers 50 mounted for rotation about parallel generally horizontal axes in the bottom steel channel 27, the axes of the rollers 50 also being substantially aligned with (parallel to) the first direction 14. The bottom surface of the ballast element 33 engages the rollers 50, while the top surface thereof is slightly spaced from the top of the upper steel channel 28, so that the power device 37 has a minimum amount of effort in moving the ballast element 33 in dimension 35, and maximum responsiveness.

As seen in FIG. 3, a control panel 18 from the cab 16 of the tractor 15 or the like is connected—e.g. by wires 52—to the hydraulic pump 43 or other device for powering movement of the ballast 33 in dimension 35.

While FIG. 3 shows various specific structures that may be utilized according to the present invention, the leveling mechanism 23 may have a wide variety of other configurations and utilize a wide variety of other devices. For example, instead of the hydraulic cylinder assembly (adjusting rod 39, cylinder 40, hydraulic pump 43, and lines 44, 45) comprising a force applicator device for effecting the movement of the ballast element 33 in dimension 35, a pneumatic cylinder assembly (which looks just like the assembly 37 only uses pneumatic fluid, therefore various of the components will have different dimensions and configurations) may be provided, or an electric, hydraulic, or pneumatic motor—illustrated schematically at 137 in FIG. 4—which is connected to a conventional screw and traveling nut assembly, or any other conventional mechanism for effecting substantially linear movement in the dimension 35.

Also, the channel shaped structure 26 may have a wide variety of configurations. For example, it may be substantially V-shaped as indicated for the structure 126 in FIG. 4 (illustrated in FIG. 4 with an open top, but also possibly having a closed top), or the ballast 133 has a configuration conforming to that of the channel shaped element 126 (e.g. the ballast 133 either having a generally triangular cross section as illustrated in solid line, or a diamond cross section illustrated in dotted line in FIG. 4). Instead of the rollers 50 relatively friction free movement may be provided by forming a coating 54 on the ballast element surfaces 133 engaging the channel shaped structure 126, or on both the ballast element 133 and channel shaped structure 126 cooperating surfaces. For example, the low friction coating 54 may be polytetrafluoroethylene, or may comprise actually the plastic exterior of the ballast element 33, particularly if it is hollow and contains ballast material.

FIG. 5 schematically illustrates a leveling mechanism 223 in which the ballast element 233 is hollow, a cutaway portion being shown at the end visible in FIG. 5 and the ballast material 55 seen therein. The material 55 may be sand, lead shot, water, or the like, and suitable closable openings 56 or the like may be provided in the ballast element 233 to fill it and/or empty it. In the FIG. 5 embodiment the substantially channel shaped structure 226 is U-shaped, and relatively friction free movement is provided by a plurality of ball bearings 57 (a plurality of such bearings 57 being provided in a number of different angular spacings along substantially the entire length of the structure 226 in the dimension 35), the ball bearings 57 being mounted in appropriate bushings within the structure 226. In this case the structure 226 has an open top and the powered ballast element moving device 237 is mounted to the top of the structure 226 and to an extension 58 of the ballast element 233.

In the FIG. 6 embodiment the leveling mechanism 323 comprises a substantially circular cross section (almost full circle semi-circle) channel shaped structure 326 while the ballast element 333 is a solid steel rod or the like. In this case lubricating fluid (liquid or gel), illustrated schematically at 60, is provided between the outer surface of the element 33 and the inner surface of the structure 326 to provide relatively friction free movement. The powered ballast element moving device is illustrated schematically at 337.

In a typical operation of the leveling mechanism 23 according to the invention, the brackets 48 are mounted to the carriage 12 of the planter 10. When the planter gets on sloped terrain 20, the angle 21 of the slope being greater than about ten degrees, the heads 11 are likely to come out of operative contact with the terrain. Therefore, the operator of the tractor 15 manipulates the controls on the control panel 18 to cause the pump 43 to pump hydraulic fluid either to line 43 or 45 to move the ballast element 33 with respect to the channel shaped structure 26. For the situation illustrated in FIG. 1, the ballast element 33 would move out of the uphill open end 34 of the structure 26 a sufficient distance to move the center of the gravity of the entire planter 10 (or the planter tractor combination depending upon the hitch mechanism and other variables) more uphill, so that the planter heads 11 again move into engagement with the soil. Once level terrain is reached the control 18 is manipulated to move the ballast element 33 so that it is substantially centered in the structure 26, and the operations are repeated every time sloping terrain is traversed moving in the first direction 14.

Thus, it will be seen that according to the present invention a simple, inexpensive, yet efficiently functional leveling mechanism has been provided, which has a wide variety of uses, but is particularly suited for use with farm implements, such as planters, to make sure that the equipment heads thereof engage the soil even when moving on sloping terrain. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims to encompass all equivalent structures and devices.

What is claimed is:

1. A farm implement comprising:

a plurality of equipment heads for engaging earth, to act on the earth;

a carriage mounting said plurality of equipment heads for movement in a first direction; and means for levelling said equipment heads when moving in the first direction over terrain that is sloped in a second direction substantially perpendicular to the first direction so that said equipment heads remain in proper operative engagement with earth, said means comprising: a channel shaped structure mounted so that it is substantially stationary with respect to said carriage and extends substantially in said second direction; a movable ballast element mounted in said channel shaped structure; a powered ballast element moving device having a first portion mounted to said ballast element, a second portion mounted to said channel shaped structure, and a force applicator for moving said first portion with respect to said second portion in said second direction to reposition said ballast element with respect to said channel shaped structure.

2. A farm implement as recited in claim 1 wherein said channel shaped structure is open ended so that portions of said ballast element may be moved by said powered ballast element moving device past either open end of said channel shaped structure.

3. A farm implement as recited in claim 2 further comprising stops for positively preventing movement of said ballast element too far out of an open end of said channel shaped structure.

4. A farm implement as recited in claim 3 wherein said stops comprise said powered ballast element moving device first portion and opposite surfaces of said channel shaped structure forming a cutout.

5. A farm implement as recited in claim 1 further comprising means for providing relatively friction free movement of said ballast element in said channel shaped structure.

6. A farm implement as recited in claim 5 wherein said means for providing relatively friction free movement of said ballast element comprises at least one of: a plurality of rollers mounted to said channel shaped structure; a plurality of ball bearings mounted to said channel shaped structure; at least one low-friction coating on at least one of said ballast element and channel shaped structure; and lubricating fluid between said ballast element and channel shaped structure.

7. A farm implement as recited in claim 6 wherein said force applicator comprises one of an hydraulic cylinder assembly and a pneumatic cylinder assembly.

8. A farm implement as recited in claim 7 further comprising a control panel for controlling operation of said force applicator from a cab or adjacent a seat remote from said levelling means.

9. A farm implement as recited in claim 1 wherein said ballast element comprises a solid heavy metal element filled with ballast material.

10. A farm implement as recited in claim 1 wherein said equipment heads and carriage comprise a planter pulled by a tractor, and wherein said levelling means is mounted directly on said carriage.

11. A farm implement as recited in claim 1 wherein said equipment heads and carriage are pulled by a tractor and wherein said levelling means is mounted directly on said tractor.

12. A farm implement as recited in claim 1 wherein said channel shaped structure comprises a substantially quadrate in cross-section shaped channel having a bottom portion, with a plurality of rollers rotatable about axes substantially parallel to the first direction mounted on said bottom portion, and wherein said ballast element has a weight of at least about 100 pounds.

13. A farm implement as recited in claim 10 wherein said force applicator comprises an hydraulic cylinder assembly controlled by a remote control mechanism.

14. A levelling mechanism comprising:

an open ended channel shaped structure mounted so that it is substantially stationary with respect to a surface and extends substantially in a first direction;

a movable ballast element mounted in said channel shaped structure so that portions of said ballast element may be moved past either open end of said channel shaped structure; and a powered ballast element moving device having a first portion mounted to said ballast element, a second portion mounted to said channel shaped structure, and a force applicator for moving said first portion with respect to said second portion in the first direction to reposition said ballast element with respect to said channel shaped element.

15. A mechanism as recited in claim 14 further comprising means for providing relatively friction free movement of said ballast element in said channel shaped structure.

16. A mechanism as recited in claim 15 wherein said means for providing relatively friction free movement of said ballast element comprises at least one of: a plurality of rollers mounted to said channel shaped structure; a plurality of ball bearings mounted to said channel shaped structure; at least one low-friction coating on at least one of said ballast element and channel shaped structure; and lubricating fluid between said ballast element and channel shaped structure.

17. A mechanism as recited in claim 15 wherein said means for providing relatively friction free movement is associated with a single channel shaped element disposed below said ballast element.

18. A mechanism as recited in claim 14 wherein said channel shaped structure is disposed below said ballast element.

* * * * *